US 10,688,576 B2

(12) United States Patent
Furuta

(10) Patent No.: US 10,688,576 B2
(45) Date of Patent: Jun. 23, 2020

(54) DIELECTRIC WORKING FLUID CENTRALIZED MANAGEMENT SYSTEM

(71) Applicant: FANUC CORPORATION, Yamanashi (JP)

(72) Inventor: Tomoyuki Furuta, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 525 days.

(21) Appl. No.: 15/437,750

(22) Filed: Feb. 21, 2017

(65) Prior Publication Data

US 2017/0239741 A1   Aug. 24, 2017

(30) Foreign Application Priority Data

Feb. 24, 2016   (JP) .................................. 2016-032673

(51) Int. Cl.
  *B23H 1/10*    (2006.01)
  *B23H 7/36*    (2006.01)
  *B23H 7/02*    (2006.01)

(52) U.S. Cl.
  CPC ................. *B23H 1/10* (2013.01); *B23H 7/36* (2013.01); *B23H 7/02* (2013.01)

(58) Field of Classification Search
  CPC ............... B23H 1/10; B23H 7/02; B23H 7/36
  USPC ...................................................... 219/69.14
  See application file for complete search history.

(56) References Cited

U.S. PATENT DOCUMENTS

2005/0023195 A1   2/2005   Kita et al.

FOREIGN PATENT DOCUMENTS

| CN | 101232965 A | 7/2008 |
| CN | 202356752   | * 8/2012 |
| CN | 202356752 U | 8/2012 |
| EP | 0275819 A2  | 7/1988 |
| JP | 6471628 A   | 3/1989 |
| JP | 1015735 A   | 1/1998 |

(Continued)

OTHER PUBLICATIONS

English Abstract (JP 04-322912) and Machine Translation for Japanese Publication No. 3034982 B2, published Feb. 18, 2000, 6 pgs.

(Continued)

Primary Examiner — Dana Ross
Assistant Examiner — Joseph W Iskra
(74) Attorney, Agent, or Firm — Fredrikson & Byron, P.A.

(57) ABSTRACT

A dielectric working fluid centralized management system is equipped with a dielectric working fluid adjustment apparatus for adjusting the fluid quality of a dielectric working fluid of a plurality of wire electrical discharge machines, a dielectric working fluid delivery and reception control member for controlling delivery and reception of the dielectric working fluid between a plurality of dielectric working fluid storage tanks disposed corresponding respectively to the plurality of wire electrical discharge machines, and in which the dielectric working fluid is stored, and the dielectric working fluid adjustment apparatus, and a dielectric working fluid quality controller, which receives dielectric working fluid information from the plurality of wire electrical discharge machines and controls the dielectric working fluid delivery and reception control member, or both the dielectric working fluid delivery and reception control member and the dielectric working fluid adjustment apparatus.

8 Claims, 3 Drawing Sheets

(56) References Cited

FOREIGN PATENT DOCUMENTS

| JP | 3034982 B2 | | 2/2000 |
|----|------------|---|--------|
| JP | 3779289 B2 | | 3/2006 |
| JP | 2008296314 A | | 12/2008 |
| JP | 201461574 A | | 4/2014 |
| KR | 100696064 | * | 3/2007 |
| KR | 100696064 B1 | | 3/2007 |
| KR | 1020080047796 A | | 5/2008 |
| KR | 1020110061021 A | | 6/2011 |

OTHER PUBLICATIONS

English Abstract (JP 2005-046984 A) for Japanese Publication No. 3779289 B2, published May 24, 2006, 2 pgs.
English Abstract and Machine Translation for Chinese Publication No. 101232965 A, published Jul. 30, 2008, 41 pgs.
English Abstract and Machine Translation for Korean Publication No. 20080047796 A, published May 30, 2008, 12 pgs.
English Abstract and Machine Translation for Korean Publication No. 20110061021 A, published Jun. 9, 2011, 10 pgs.
English Abstract and Machine Translation for Japanese Publication No. 2014-061574 A, published Apr. 10, 2014, 8 pgs.
English Abstract and Machine Translation for Japanese Publication No. 2008-296314 A, published Dec. 11, 2008, 19 pgs.
English Abstract and Machine Translation for Japanese Publication No. JPH10-015735 A, published Jan. 20, 1998, 9 pgs.
English Abstract and Machine Translation for Japanese Publication No. JPS64-071628 A, published Mar. 16, 1989, 13 pgs.
Untranslated Decision to Grant a Patent mailed by Japan Patent Office (JPO) for Application No. JP 2016-032673, dated Sep. 11, 2018, 3 pages.
English Machine Translation of Decision to Grant a Patent mailed by Japan Patent Office (JPO) for Application No. JP 2016-032673, dated Sep. 11, 2018, 3 pages.
Untranslated Decision of Refusal mailed by Japan Patent Office (JPO) for Application No. JP 2016-032673, dated Jul. 10, 2018, 3 pages.
English Machine Translation of Decision of Refusal mailed by Japan Patent Office (JPO) for Application No. JP 2016-032673, dated Jul. 10, 2018, 3 pages.
Untranslated Notification of Reasons for Refusal mailed by Japan Patent Office (JPO) for Application No. JP 2016-032673, dated Feb. 6, 2018, 4 pages.
English Machine Translation of Notification of Reasons for Refusal mailed by Japan Patent Office (JPO) for Application No. JP 2016-032673, dated Feb. 6, 2018, 4 pages.
English Abstract for Chinese Publication No. 202356752 U, published Aug. 1, 2012, 1 pg.
English Abstract for Korean Publication No. 100696064 B1, published Mar. 16, 2007, 1 pg.
English Abstract for European Publication No. 0275819 A2, published Jul. 27, 1988, 1 pg.
Search Report and Written Opinion dated Jul. 6, 2017 for related European Application No. 17000293.5, 8 pgs.

* cited by examiner

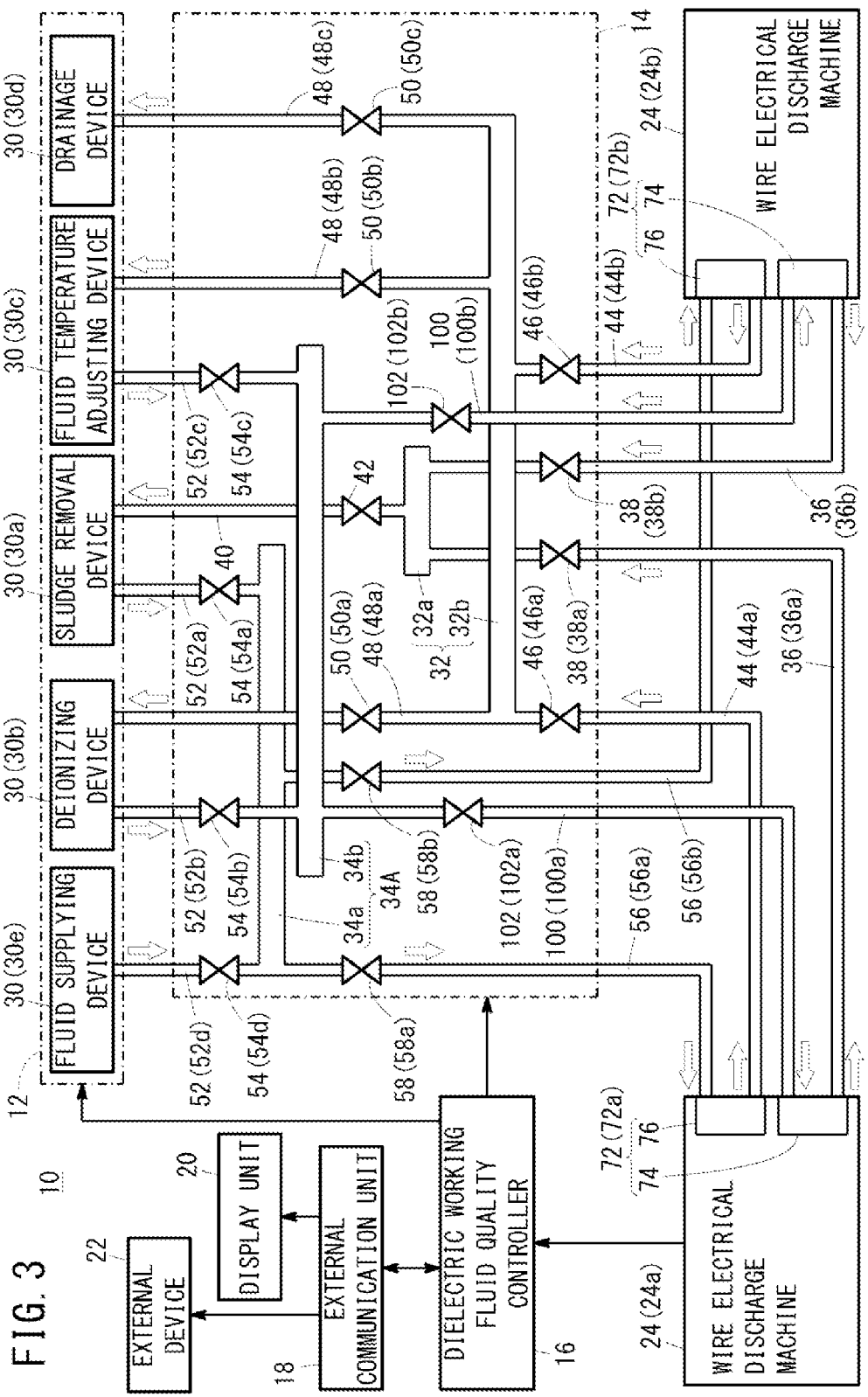

DIELECTRIC WORKING FLUID CENTRALIZED MANAGEMENT SYSTEM

CROSS-REFERENCE TO RELATED APPLICATION

This application is based upon and claims the benefit of priority from Japanese Patent Application No. 2016-032673 filed on Feb. 24, 2016, the contents of which are incorporated herein by reference.

BACKGROUND OF THE INVENTION

Field of the Invention

The present invention relates to a dielectric working fluid centralized management system for adjusting and managing the fluid quality of a dielectric working fluid in a plurality of wire electrical discharge machines.

Description of the Related Art

A wire electrical discharge machine is a processing machine for performing machining on a workpiece by way of electrical discharge that occurs between a wire electrode and the workpiece through a dielectric working fluid. At this time, because the dielectric working fluid becomes contaminated by machining waste (hereinafter referred to as sludge) that is generated during machining, there is a need to treat the polluted fluid (polluted machining fluid) and produce a clean dielectric working fluid. Further, since the dielectric working fluid becomes heated by heat that is generated by the wire electrical discharge machining process, there is a need to adjust the temperature of the dielectric working fluid to a temperature that is suitable for wire electrical discharge machining.

In Japanese Patent No. 3034982 and Japanese Patent No. 3779289, there is disclosed a machining fluid controller for an electrical discharge machine that controls a dielectric working fluid. More specifically, the machining fluid controller for an electrical discharge machine comprises a machining vessel (machining tank, or work-pan) in which there is stored a dielectric working fluid for carrying out electrical discharge machining, a dirty fluid tank (dirty tank) in which there is stored a polluted fluid discharged from the machining tank, a filter for removing sludge from the dielectric working fluid in the dirty fluid tank, a clean fluid tank (clean tank) in which there is stored a clean dielectric working fluid that was cleaned by removal of sludge from the fluid, and a cooling device (temperature regulator) for adjusting the temperature of the dielectric working fluid.

SUMMARY OF THE INVENTION

In order to manage the fluid quality of the dielectric working fluid to keep it constant, it is necessary to periodically exchange consumables therein such as the dielectric working fluid and filters or the like. The time that the various consumables such as filters and dielectric working fluids, etc., should be exchanged differs from each other depending on the electrical discharge machines, an operator is required to manage the states of the consumables of all of the electrical discharge machines for which he or she is in charge of. In other words, the operator checks the conditions of the various consumables such as filters, dielectric working fluids, etc., of the respective electrical discharge machines, and as necessary, carries out exchange and replacement of the consumables. For example, in the case that multiple electrical discharge machines are installed over a wide factory area, in order to carry out such condition checking and exchange of consumables, the operator has to move over the factory from end to end thereof.

Further, in order to manage the fluid quality of the dielectric working fluid to keep it constant, the temperatures of the electrical discharge machines must also be adjusted. When temperature regulators such as cooling devices or the like for adjusting the temperature of the dielectric working fluid are provided in each of the electrical discharge machines, the temperature regulators are arranged together inside the factory in which the electrical discharge machines are installed. The temperature regulators provided in the electrical discharge machines primarily operate to reduce the temperatures thereof, and therefore the room temperature in the interior of the factory rises due to the heat that is discharged from the temperature regulators of the respective electrical discharge machines. In the case that high precision machining is to be carried out, it is necessary for the temperature in the vicinity of the electrical discharge machines to be kept as constant as possible. Therefore, there is a need for temperature regulating equipment of the factory to have a higher processing capacity, and equipment requirements are increased. Further, in the case that the fluid quality of the dielectric working fluid of each of the electrical discharge machines is managed, while using consumables such as filters, etc., and temperature regulators that are provided in each of the electrical discharge machines, the cost for the electrical discharge machines tends to increase together with the occurrence of inefficiencies.

Thus, the present invention has the object of providing a dielectric working fluid centralized management system, which facilitates maintenance and inspection, and further lowers the cost of devices or components that serve to adjust the fluid quality of a dielectric working fluid in a plurality of wire electrical discharge machines.

The present invention is characterized by a dielectric working fluid centralized management system, comprising a dielectric working fluid adjustment apparatus configured to adjust fluid quality of a dielectric working fluid of a plurality of wire electrical discharge machines, a dielectric working fluid delivery and reception control member configured to control delivery and reception of the dielectric working fluid between a plurality of dielectric working fluid storage tanks disposed corresponding respectively to the plurality of wire electrical discharge machines, and in which the dielectric working fluid is stored, and the dielectric working fluid adjustment apparatus, and a dielectric working fluid quality controller configured to receive dielectric working fluid information from the plurality of wire electrical discharge machines, and to control the dielectric working fluid delivery and reception control member, or both the dielectric working fluid delivery and reception control member and the dielectric working fluid adjustment apparatus.

In accordance with such a configuration, batch management can be performed for the fluid quality of the dielectric working fluid of each of the plurality of wire electrical discharge machines, i.e., the fluid quality can be managed collectively. Further, maintenance and inspection of devices or materials that adjust the fluid quality of the dielectric working fluid of the plurality of wire electrical discharge machines is facilitated, and together therewith, since there is no need to provide the dielectric working fluid adjustment apparatus in each of the wire electrical discharge machines, equipment expenditures can be reduced in cost.

In the dielectric working fluid centralized management system of the present invention, the dielectric working fluid adjustment apparatus may comprise at least one dielectric working fluid adjustment device selected from among a fluid supplying device configured to supply a new dielectric working fluid, a deionizing device configured to adjust an electrical conductivity of the dielectric working fluid, a sludge removal device configured to remove sludge generated in the dielectric working fluid due to electrical discharge, a drainage device configured to drain the dielectric working fluid, and a fluid temperature adjusting device configured to adjust the temperature of the dielectric working fluid. In accordance with this feature, the dielectric working fluid can be adjusted to a necessary fluid quality for performing wire electrical discharge machining.

In the dielectric working fluid centralized management system of the present invention, the dielectric working fluid delivery and reception control member may include a common fluid feed pipe and a common fluid receiving pipe that are connected to the plurality of dielectric working fluid storage tanks and the dielectric working fluid adjustment apparatus, the common fluid feed pipe may be a pipe for the dielectric working fluid that flows from the dielectric working fluid adjustment apparatus to the plurality of dielectric working fluid storage tanks, and the common fluid receiving pipe may be a pipe for the dielectric working fluid that flows from the plurality of dielectric working fluid storage tanks to the dielectric working fluid adjustment apparatus, and additionally, the dielectric working fluid delivery and reception control member may control connections between the dielectric working fluid storage tanks and each of respective dielectric working fluid adjustment devices of the dielectric working fluid adjustment apparatus. In accordance with this feature, since the number of pipes is reduced, it is possible for the installation area for piping to be made smaller, and equipment expenditures can be suppressed.

In the dielectric working fluid centralized management system of the present invention, the dielectric working fluid quality controller may control at least the dielectric working fluid delivery and reception control member, so that at least one from among a fluid amount of the dielectric working fluid of the wire electrical discharge machines, an electrical conductivity of the dielectric working fluid, a fluid level of the dielectric working fluid of the dielectric working fluid storage tanks, a freshness of the dielectric working fluid, and a temperature of the dielectric working fluid approaches a target value or falls within an allowable range. In accordance with this feature, the dielectric working fluid can be adjusted to a necessary fluid quality for performing wire electrical discharge machining.

The dielectric working fluid centralized management system of the present invention may further comprise an external communication unit configured to perform communication with an external device, wherein, through the external communication unit, the dielectric working fluid quality controller obtains from the external device the target value or the allowable range. In accordance with this feature, the fluid quality of the dielectric working fluid can be controlled from the external device. In other words, the fluid quality of the dielectric working fluid can be managed from a remote location distanced from the dielectric working fluid centralized management system.

In the dielectric working fluid centralized management system of the present invention, the dielectric working fluid quality controller may control the dielectric working fluid delivery and reception control member so as to connect the dielectric working fluid storage tank of one of the wire electrical discharge machines to the dielectric working fluid adjustment apparatus, in order not to mix with each other the dielectric working fluids of the plurality of wire electrical discharge machines. In accordance with this feature, the fluid quality of the dielectric working fluid of each of the wire electrical discharge machines can easily be adjusted and managed.

In the dielectric working fluid centralized management system of the present invention, in a case it is determined, based on the dielectric working fluid information received from each of the plurality of wire electrical discharge machines, that it is necessary to connect the dielectric working fluid storage tanks of the plurality of wire electrical discharge machines to the dielectric working fluid adjustment apparatus, then on a basis of the dielectric working fluid information of each of the wire electrical discharge machines, the dielectric working fluid quality controller may determine a priority of the wire electrical discharge machines to be connected to the dielectric working fluid adjustment apparatus. In accordance with this feature, since adjustment of the dielectric working fluid is performed in order from the wire electrical discharge machines requiring urgent attention, productivity can be improved without requiring stoppage of the wire electrical discharge machines.

The dielectric working fluid centralized management system of the present invention may further comprise an external communication unit configured to perform communication with external equipment, wherein, after the electric working fluid delivery and reception control member is controlled, and the dielectric working fluid storage tank of the wire electrical discharge machine that serves as an adjustment target has been connected to the dielectric working fluid adjustment apparatus, the dielectric working fluid quality controller may determine whether or not the quality of the dielectric working fluid falls within an allowable dielectric working fluid quality range on a basis of the dielectric working fluid information received from the wire electrical discharge machine that is the adjustment target, whereas in a case it is determined that the quality of the dielectric working fluid of the wire electrical discharge machine that is the adjustment target falls outside of the allowable dielectric working fluid quality range, even if a predetermined time has elapsed, may determine that there is an abnormality in the dielectric working fluid adjustment device of the dielectric working fluid adjustment apparatus by which the fluid quality of the dielectric working fluid was adjusted, and may transmit through the external communication unit abnormality information of the dielectric working fluid adjustment device that was determined to be abnormal. In accordance with this feature, it can be notified to the exterior whether a particular dielectric working fluid adjustment device is abnormal, maintenance operations thereon can swiftly be carried out, and productivity can be improved.

In the dielectric working fluid centralized management system of the present invention, the external equipment may be a display unit, and in a case that the abnormality information is received, the display unit may display an indication that there is an abnormality in the dielectric working fluid adjustment device that was judged to be abnormal. In accordance with this feature, an operator can easily and quickly confirm dielectric working fluid adjustment devices that are abnormal.

The dielectric working fluid centralized management system of the present invention may further comprise an external communication unit configured to perform communication with an external device, wherein the external communication unit may transmit at least one of the dielectric working fluid information acquired from the dielectric working fluid quality controller, and operating information of each of the dielectric working fluid adjustment devices of the dielectric working fluid adjustment apparatus. In accordance with this feature, from a remote location distanced from the dielectric working fluid centralized management system, the operator can determine an order of priority of the wire electrical discharge machines connected to the dielectric working fluid adjustment apparatus, and the lifetime of respective consumables therein can be determined and estimated.

According to the present invention, the fluid quality of the dielectric working fluid of each of the plurality of wire electrical discharge machines can be managed collectively. Further, maintenance and inspection of devices or materials that adjust the fluid quality of the dielectric working fluid of the plurality of wire electrical discharge machines is facilitated, and together therewith, since there is no need to provide the dielectric working fluid adjustment apparatus in each of the wire electrical discharge machines, equipment expenditures can be reduced in cost.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a view showing a configuration of a dielectric working fluid centralized management system according to a modification.

DESCRIPTION OF THE PREFERRED EMBODIMENTS

A preferred embodiment of a dielectric working fluid centralized management system according to the present invention shall be presented and described in detail below with reference to the accompanying drawings.

Figure 1:
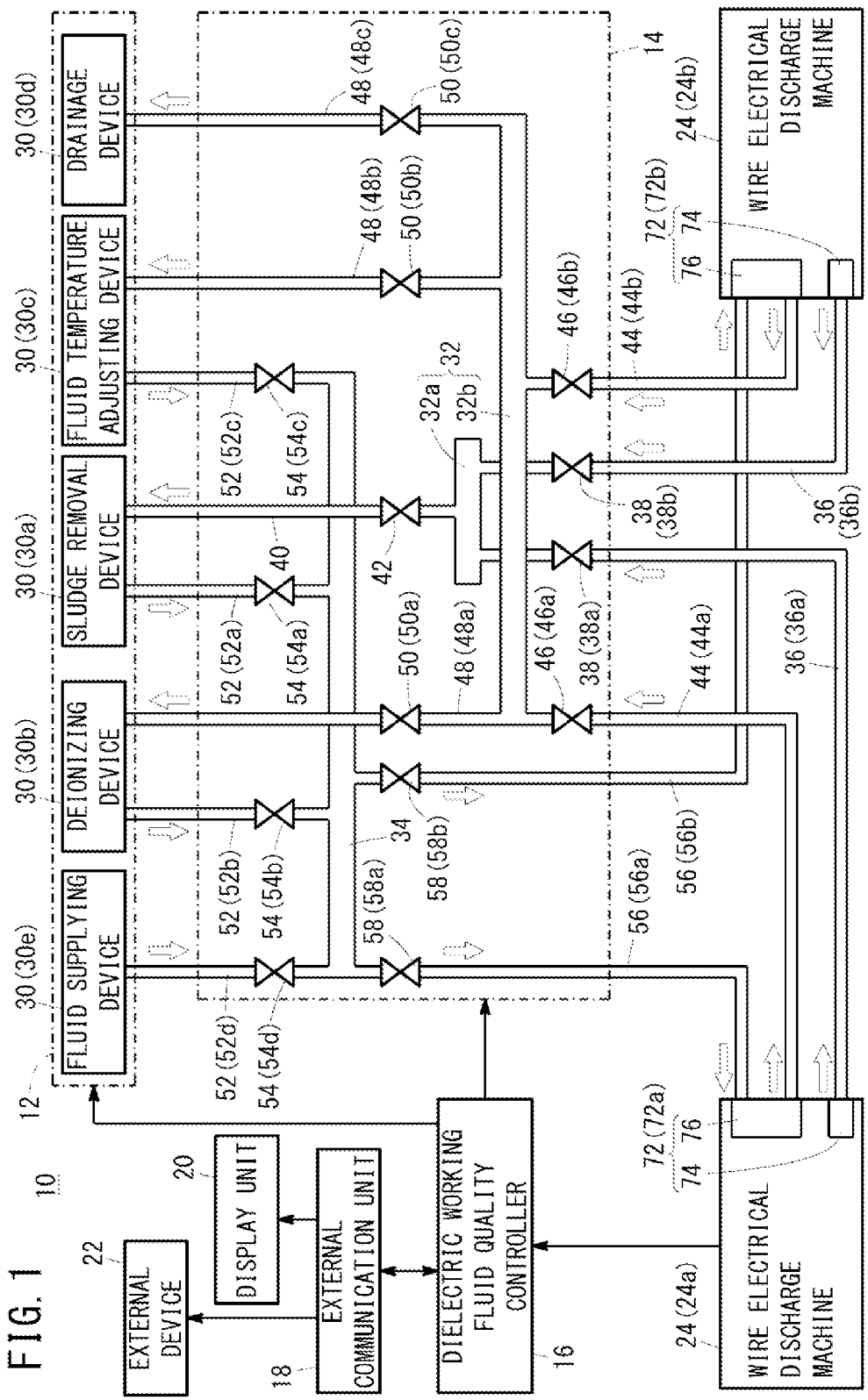
FIG. 1 is a view showing a configuration of a dielectric working fluid centralized management system according to a present embodiment.

FIG. 1 is a view showing a configuration of a dielectric working fluid centralized management system 10 according to a present embodiment. The dielectric working fluid centralized management system 10 is equipped with a dielectric working fluid adjustment apparatus 12, a dielectric working fluid delivery and reception control member 14, a dielectric working fluid quality controller 16, an external communication unit 18, a display unit 20, and an external device 22. In the dielectric working fluid centralized management system 10, batch management can be performed for the fluid quality of the dielectric working fluid LQ of each of a plurality of wire electrical discharge machines 24, i.e., the fluid quality can be managed collectively.

In order to facilitate understanding of the description, in FIG. 1, an example is shown in which two wire electrical discharge machines 24 are connected to the dielectric working fluid centralized management system 10, however, the invention is not limited to this feature. For example, three to several tens of wire electrical discharge machines 24 may be connected to the dielectric working fluid centralized management system 10, whereby the dielectric working fluid centralized management system 10 is capable of managing collectively the fluid quality of the dielectric working fluids LQ of the three to several tens of wire electrical discharge machines 24.

The dielectric working fluid adjustment apparatus 12 is equipped with one or two or more dielectric working fluid adjustment devices 30 that adjust the fluid quality of the dielectric working fluid (e.g., water) LQ of the plurality (two in the present embodiment) of wire electrical discharge machines 24. In the case that the dielectric working fluid adjustment apparatus 12 comprises a plurality of (two or more) dielectric working fluid adjustment devices 30, the dielectric working fluid adjustment apparatus 12 is equipped with mutually different dielectric working fluid adjustment devices 30 for adjusting the fluid quality. In the present embodiment, the dielectric working fluid adjustment apparatus 12 is equipped with five dielectric working fluid adjustment devices 30 made up from a sludge removal device 30a, a deionizing device 30b, a fluid temperature adjusting device 30c, a drainage device 30d, and a fluid supplying device 30e.

The sludge removal device 30a removes sludge from a dielectric working fluid LQ that has become polluted by sludge (machining waste) generated by the wire electrical discharge machining process, and produces a clean dielectric working fluid LQ. The sludge removal device 30a includes a non-illustrated filter, and sludge is removed from the polluted dielectric working fluid LQ by passage of the polluted dielectric working fluid LQ through the filter. The deionizing device 30b adjusts the electrical conductivity of the dielectric working fluid LQ. The deionizing device 30b includes an ion exchange resin, and decreases the electrical conductivity of the dielectric working fluid LQ by the ion exchange resin. The fluid temperature adjusting device 30c reduces the temperature of the dielectric working fluid LQ by cooling the dielectric working fluid LQ. In general, since the temperature of the dielectric working fluid LQ rises due to the wire electrical discharge machining process, the dielectric working fluid LQ is cooled. The drainage device 30d drains the degraded dielectric working fluid (deteriorated working fluid) LQ that has become degraded in order to prevent deterioration of the dielectric working fluid LQ. The fluid supplying device 30e compensates for an insufficiency of the dielectric working fluid LQ by supplying a new dielectric working fluid LQ. The dielectric working fluid adjustment devices 30 (30a through 30e) are devices that serve to adjust the fluid quality of the dielectric working fluid LQ in order to preserve the machining accuracy of the wire electrical discharge machining process.

Heat that is generated as a result of performing cooling by the fluid temperature adjusting device 30c may be released through non-illustrated piping to the exterior of the factory in which the wire electrical discharge machines 24 are installed. Further, the dielectric working fluid centralized management system 10 itself may be installed at a location outside of the factory in which the wire electrical discharge machines 24 are installed. In this manner, since the dielectric working fluid LQ of the plurality of wire electrical discharge machines 24 are cooled by a single fluid temperature adjusting device 30c, and heat generated due to such cooling is released outside of the factory, the temperature in the interior of the factory does not rise. Consequently, a decrease in the accuracy of the wire discharge machining process can be suppressed, together with suppressing a rise in equipment expenditures.

Conventionally, since fluid temperature adjusting devices (temperature regulators) have been provided for each of the wire electrical discharge machines, the temperature inside the factory where the plural wire electrical discharge machines are installed rises due to heat that is released by the plural temperature regulators. In the case that high precision machining is to be carried out, in order to preserve consistency in temperature insofar as possible around the electrical discharge machines, it has been necessary to provide separately in the interior of the factory a cooling device for cooling the temperature inside the factory, or to provide in each of the wire electrical discharge machines temperature regulators with high processing capacity and which do not generate so much heat. Further, although a method may be considered in which heat generated by the temperature regulators of the respective wire electrical discharge machines is released through piping to the exterior of the factory, the number of such pipes becomes large, and the installation space required therefor increases. In any of such cases, since it is necessary to provide cooling devices, high processing capacity temperature regulators, or a plurality of pipes or the like, equipment expenditures therefor have tended to be high.

Dielectric working fluid storage tanks 72 for storing dielectric working fluids LQ are provided in each of the two wire electrical discharge machines 24. In this instance, in order to distinguish the two wire electrical discharge machines 24 and the dielectric working fluid storage tanks 72 from each other, one of the wire electrical discharge machines 24 and the dielectric working fluid storage tank 72 therefor are represented by 24a and 72a, whereas the other wire electrical discharge machines 24 and the dielectric working fluid storage tank 72 therefor are represented by 24b and 72b.

The dielectric working fluid delivery and reception control member 14 controls the delivery and reception of the dielectric working fluid LQ between the dielectric working fluid storage tanks 72 (72a, 72b) that are provided in each of the two wire electrical discharge machines 24, and the dielectric working fluid adjustment apparatus 12. The dielectric working fluid delivery and reception control member 14 includes a common fluid receiving pipe 32 and a common fluid feed pipe 34 that connect the two dielectric working fluid storage tanks 72 (72a, 72b) and the dielectric working fluid adjustment apparatus 12. The common fluid receiving pipe 32 is a pipe for the dielectric working fluid LQ that flows from the two dielectric working fluid storage tanks 72 (72a, 72b) to the dielectric working fluid adjustment apparatus 12, and the common fluid feed pipe 34 is a pipe for the dielectric working fluid LQ that flows from the dielectric working fluid adjustment apparatus 12 to the two dielectric working fluid storage tanks 72 (72a, 72b). The dielectric working fluid delivery and reception control member 14 controls connections between the dielectric working fluid storage tanks 72 (72a, 72b) and the respective dielectric working fluid adjustment devices 30 of the dielectric working fluid adjustment apparatus 12.

The common fluid receiving pipe 32 is a pipe for the purpose of connecting the respective dielectric working fluid storage tanks 72 (72a, 72b) with the sludge removal device 30a, the deionizing device 30b, the fluid temperature adjusting device 30c, and the drainage device 30d. The common fluid receiving pipe 32 includes a first common pipe 32a and a second common pipe 32b. The first common pipe 32a connects contaminant tanks 74 of the respective dielectric working fluid storage tanks 72 (72a, 72b) and the sludge removal device 30a, in order for the dielectric working fluid LQ from the contaminant tanks 74 of the respective dielectric working fluid storage tanks 72 (72a, 72b) to flow to the sludge removal device 30a. The second common pipe 32b connects clean tanks 76 of the respective dielectric working fluid storage tanks 72 (72a, 72b) and the deionizing device 30b, the fluid temperature adjusting device 30c, and the drainage device 30d, in order for the dielectric working fluid LQ from the clean tanks 76 of the respective dielectric working fluid storage tanks 72 (72a, 72b) to flow respectively to the deionizing device 30b, the fluid temperature adjusting device 30c, and the drainage device 30d.

The common fluid feed pipe 34 is a pipe for the purpose of connecting the clean tanks 76 of the respective dielectric working fluid storage tanks 72 (72a, 72b) with the sludge removal device 30a, the deionizing device 30b, the fluid temperature adjusting device 30c, and the fluid supplying device 30e. The common fluid feed pipe 34 enables the dielectric working fluid LQ from the sludge removal device 30a, the deionizing device 30b, the fluid temperature adjusting device 30c, and the fluid supplying device 30e to flow to the clean tanks 76 of the respective dielectric working fluid storage tanks 72 (72a, 72b).

Hereinafter, piping (connecting pipes) that serves to connect the dielectric working fluid storage tanks 72 (72a, 72b) and the dielectric working fluid adjustment apparatus 12 will be described in further detail. The dielectric working fluid delivery and reception control member 14 includes two connecting pipes 36 (36a, 36b) that connect the first common pipe 32a with the contaminant tanks 74 of the two dielectric working fluid storage tanks 72 (72a, 72b). The contaminant tanks 74 store dielectric working fluids LQ that have become polluted by sludge. Valves 38 (38a, 38b) are provided respectively in each of the connecting pipes 36 (36a, 36b). Opening and closing of the two valves 38 (38a, 38b) is controlled, whereby it can be switched whether or not to supply to the first common pipe 32a the dielectric working fluids LQ stored in each of the contaminant tanks 74 of the two dielectric working fluid storage tanks 72 (72a, 72b). Moreover, the flow rate of the dielectric working fluids LQ supplied to the first common pipe 32a may be controlled by controlling the degree of opening or closing of the valves 38 (38a, 38b).

Further, the dielectric working fluid delivery and reception control member 14 includes a pipe 40 that connects the first common pipe 32a and the sludge removal device 30a. A valve 42 is disposed in the pipe 40. By controlling opening and closing of the valve 42, it can be switched whether or not to supply to the sludge removal device 30a the dielectric working fluid LQ inside the first common pipe 32a. The sludge removal device 30a removes sludge contained within the supplied dielectric working fluid LQ using a filter. Moreover, the flow rate of the dielectric working fluid LQ supplied to the sludge removal device 30a may be controlled by controlling the degree of opening or closing of the valve 42. Flow of the dielectric working fluid LQ to the sludge removal device 30a from the contaminant tanks 74 of the two dielectric working fluid storage tanks 72 (72a, 72b) is controlled by at least one from among a pump (not shown) provided in the dielectric working fluid delivery and reception control member 14, or pumps (not shown) incorporated in the wire electrical discharge machines 24 and provided for the purpose of circulating the dielectric working fluid LQ inside the wire electrical discharge machines 24.

The dielectric working fluid delivery and reception control member 14 includes two connecting pipes 44 (44a, 44b) that connect the second common pipe 32b with the clean tanks 76 of the two dielectric working fluid storage tanks 72 (72a, 72b). The clean tanks 76 store therein dielectric working fluid (clean dielectric working fluid) LQ from which sludge has been removed. Valves 46 (46a, 46b) are provided respectively in each of the connecting pipes 44 (44a, 44b). Opening and closing of the two valves 46 (46a, 46b) is controlled, whereby it can be switched whether or not to supply to the second common pipe 32b the dielectric working fluids LQ stored in each of the clean tanks 76 of the two dielectric working fluid storage tanks 72 (72a, 72b). Moreover, the flow rate of the dielectric working fluid LQ supplied to the second common pipe 32b may be controlled by controlling the degree of opening or closing of the valves 46 (46a, 46b).

Further, the dielectric working fluid delivery and reception control member 14 includes three pipes 48 (48a, 48b, 48c) that connect the second common pipe 32b with the deionizing device 30b, the fluid temperature adjusting device 30c, and the drainage device 30d. Valves 50 (50a, 50b, 50c) are provided respectively in each of the pipes 48 (48a, 48b, 48c). Opening and closing of the three valves 50 (50a, 50b, 50c) is controlled, whereby it can be switched whether or not to supply the dielectric working fluid LQ inside the second common pipe 32b to each of the deionizing device 30b, the fluid temperature adjusting device 30c, and the drainage device 30d. The deionizing device 30b adjusts (e.g., reduces) the electrical conductivity of the supplied dielectric working fluid LQ, the fluid temperature adjusting device 30c adjusts the temperature of (e.g., cools) the supplied dielectric working fluid LQ, and the drainage device 30d drains the supplied dielectric working fluid LQ. Moreover, the flow rate of the dielectric working fluid LQ supplied to the deionizing device 30b, the fluid temperature adjusting device 30c, and the drainage device 30d may be controlled by controlling the degree of opening or closing of the valves 50 (50a, 50b, 50c). Flow of the dielectric working fluid LQ to the deionizing device 30b, the fluid temperature adjusting device 30c, and the drainage device 30d from the clean tanks 76 of the two dielectric working fluid storage tanks 72 (72a, 72b) is controlled by at least one from among a pump (not shown) provided in the dielectric working fluid delivery and reception control member 14, or pumps (not shown) incorporated in the wire electrical discharge machines 24 and provided for the purpose of circulating the dielectric working fluid LQ inside the wire electrical discharge machines 24.

The dielectric working fluid delivery and reception control member 14 includes four pipes 52 (52a, 52b, 52c, 52d) that connect the common fluid feed pipe 34 with the sludge removal device 30a, the deionizing device 30b, the fluid temperature adjusting device 30c, and the fluid supplying device 30e. Valves 54 (54a, 54b, 54c, 54d) are provided respectively in each of the pipes 52 (52a, 52b, 52c, 52d). Opening and closing of the four pipes 54 (54a, 54b, 54c, 54d) is controlled, whereby it can be switched whether or not to supply the dielectric working fluids LQ from each of the sludge removal device 30a, the deionizing device 30b, the fluid temperature adjusting device 30c, and the fluid supplying device 30e, respectively, to the common fluid feed pipe 34. The dielectric working fluid LQ supplied to the common fluid feed pipe 34 from the sludge removal device 30a becomes a clean dielectric working fluid LQ from which sludge has been removed, whereas the dielectric working fluid LQ supplied to the common fluid feed pipe 34 from the deionizing device 30b becomes an adjusted dielectric working fluid LQ whose electrical conductivity is adjusted. The dielectric working fluid LQ supplied to the common fluid feed pipe 34 from the fluid temperature adjusting device 30c becomes an adjusted dielectric working fluid LQ, the temperature of which is adjusted (e.g., cooled), whereas a new dielectric working fluid LQ is supplied to the common fluid feed pipe 34 from the fluid supplying device 30e. Moreover, the flow rates of the dielectric working fluids LQ supplied to the common fluid feed pipe 34 respectively from each of the sludge removal device 30a, the deionizing device 30b, the fluid temperature adjusting device 30c, and the fluid supplying device 30e may be controlled by controlling the degree of opening or closing of the valves 54 (54a, 54b, 54c, 54d).

The dielectric working fluid delivery and reception control member 14 includes two connecting pipes 56 (56a, 56b) that connect the common fluid feed pipe 34 with the clean tanks 76 of the two dielectric working fluid storage tanks 72 (72a, 72b). Valves 58 (58a, 58b) are provided respectively in each of the connecting pipes 56 (56a, 56b). Opening and closing of the two valves 58 (58a, 58b) is controlled, whereby it can be switched whether or not to supply the dielectric working fluid LQ inside the common fluid feed pipe 34 to the clean tanks 76 of the two dielectric working fluid storage tanks 72 (72a, 72b). Moreover, the flow rate of the dielectric working fluid LQ supplied to each of the clean tanks 76 of the two dielectric working fluid storage tanks 72 (72a, 72b) may be controlled by controlling the degree of opening or closing of the valves 58 (58a, 58b). Flow of the dielectric working fluid LQ to the clean tanks 76 of the two dielectric working fluid storage tanks 72 (72a, 72b) from the sludge removal device 30a, the deionizing device 30b, the fluid temperature adjusting device 30c, and the fluid supplying device 30e is controlled by at least one from among a pump (not shown) provided in the dielectric working fluid delivery and reception control member 14, or pumps (not shown) incorporated in the wire electrical discharge machines 24 and provided for the purpose of circulating the dielectric working fluid LQ inside the wire electrical discharge machines 24.

In this manner, by controlling opening and closing of the valves 38, 42, 46, 50, 54, 58, the flow passages in which the dielectric working fluid LQ flows can be changed. Accordingly, the connections between the dielectric working fluid storage tanks 72 (72a, 72b) and the respective dielectric working fluid adjustment devices 30 of the dielectric working fluid adjustment apparatus 12 can be changed (controlled). The valves 38, 42, 46, 50, 54, 58 may be solenoid valves, motor-operated valves, or air-driven valves.

The dielectric working fluid (dielectric working fluid polluted by sludge) LQ from the contaminant tanks 74 of the respective dielectric working fluid storage tanks 72 (72a, 72b) is supplied to the sludge removal device 30a through the connecting pipes 36 (36a, 36b), the first common pipe 32a, and the pipe 40. In addition, the clean dielectric working fluid LQ from which sludge has been removed by the sludge removal device 30a is supplied to the clean tanks 76 of the respective dielectric working fluid storage tanks 72 (72a, 72b) through the pipe 52a, the common fluid feed pipe 34, and the connecting pipes 56 (56a, 56b). Consequently, the clean dielectric working fluid LQ from which sludge has been removed from the contaminated dielectric working fluid LQ stored in the contaminant tanks 74 of the respective dielectric working fluid storage tanks 72 (72a, 72b) is supplied to the clean tanks 76 of the respective dielectric working fluid storage tanks 72 (72a, 72b).

Further, the dielectric working fluid (clean dielectric working fluid) LQ stored in the clean tanks 76 of the respective dielectric working fluid storage tanks 72 (72a, 72b) is supplied to the deionizing device 30b, the fluid temperature adjusting device 30c, and the drainage device 30d through the connecting pipes 44 (44a, 44b), the second common pipe 32b, and the pipes 48 (48a, 48b, 48c). In addition, the dielectric working fluid LQ, the electrical conductivity and the temperature of which have been adjusted by the deionizing device 30b and the fluid temperature adjusting device 30c, and the new dielectric working fluid LQ supplied from the fluid supplying device 30e are supplied to the clean tanks 76 of the respective dielectric working fluid storage tanks 72 (72a, 72b) through the pipes 52b, 52c, 52d, the common fluid feed pipe 34, and the connecting pipes 56 (56a, 56b). The dielectric working fluid LQ supplied to the drainage device 30d is discharged to the exterior. Consequently, deterioration of the dielectric working fluid LQ stored in the clean tanks 76 of the respective dielectric working fluid storage tanks 72 (72a, 72b) can be prevented, together with leaving the electrical conductivity and the temperature of the dielectric working fluid LQ in a state suitable for wire electrical discharge machining.

Based on dielectric working fluid information transmitted from each of the plurality of wire electrical discharge machines 24 (24a, 24b), the dielectric working fluid quality controller 16 controls the dielectric working fluid delivery and reception control member 14 (the respective valves 38, 42, 46, 50, 54, 58 and the aforementioned pump), or both the dielectric working fluid delivery and reception control member 14 and the dielectric working fluid adjustment apparatus 12, whereby the fluid quality of the dielectric working fluid LQ in each of the wire electrical discharge machines 24 is adjusted. Prior to describing controls of the dielectric working fluid quality controller 16, a description will be given concerning the wire electrical discharge machines 24 (24a, 24b). It is noted that the wire electrical discharge machines 24 (24a, 24b) both mutually possess the same configuration, respectively.

Figure 2:
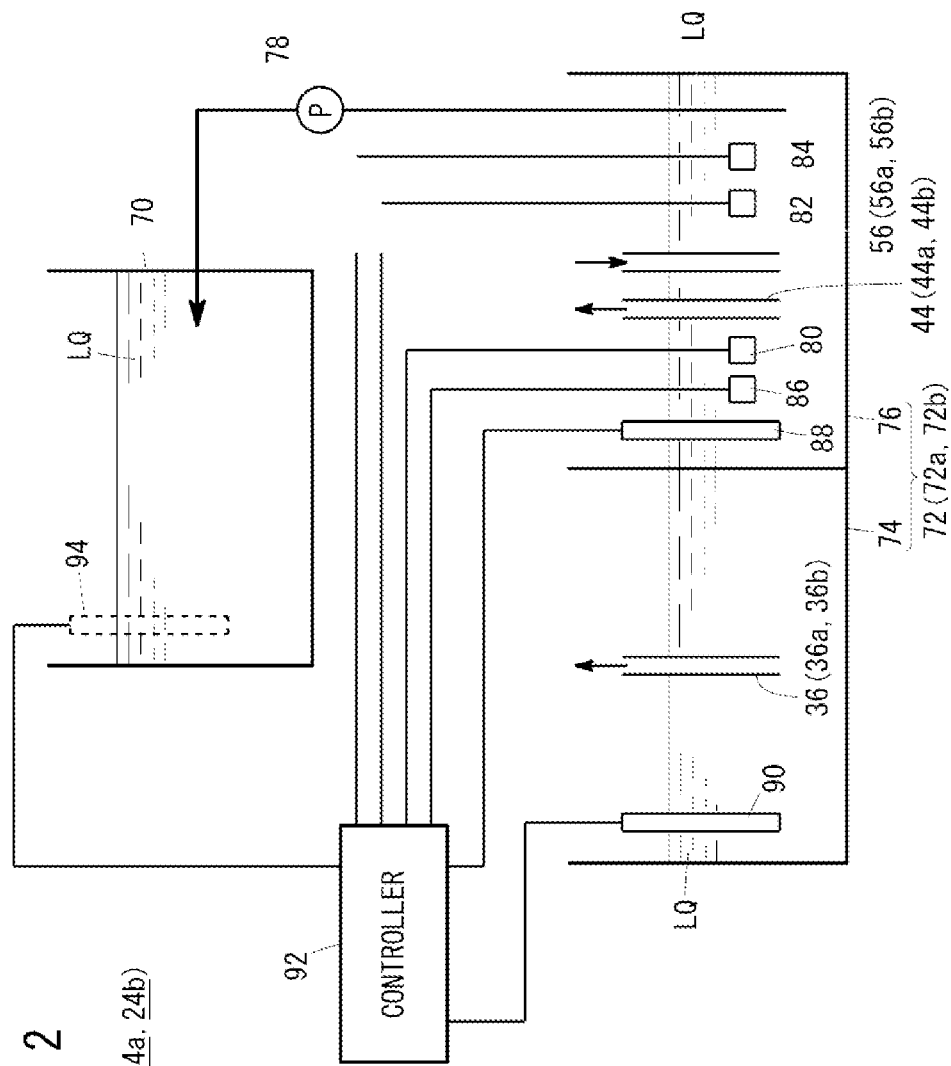
FIG. 2 is a view showing a machining tank and a dielectric working fluid storage tank that are provided in a wire electrical discharge machine shown in FIG. 1.

FIG. 2 is a view showing a machining tank (work-pan) 70 and the dielectric working fluid storage tank 72 that are provided in the wire electrical discharge machines 24. In FIG. 2, the wire electrodes of the wire electrical discharge machines 24, structures for stretching the wire electrodes, and the workpiece, etc., are omitted from illustration. The machining tank 70 is a tank for the purpose of performing wire electrical discharge machining. Normally, wire electrical discharge machining is carried out in a state in which the dielectric working fluid LQ is collected and stored in the machining tank 70, and a workpiece is immersed in the dielectric working fluid LQ. For this reason, using a pump 78, a clean dielectric working fluid LQ is pumped into and supplied to the machining tank 70 by the pump 78 from the clean tank 76, and the machining tank 70 is filled with the dielectric working fluid LQ.

As noted previously, when wire electrical discharge machining is carried out, the dielectric machining fluid LQ inside the machining tank 70 becomes polluted by sludge that is generated as a result of such machining. Therefore, using the non-illustrated pump, a clean dielectric working fluid LQ from the clean tank 76 continues to be injected from a non-illustrated injection nozzle, thereby continuously filling a portion between the wire electrode and the workpiece with the need for a clean dielectric working fluid LQ suitable for wire electrical discharge machining through piping (not shown). Dielectric working fluid LQ that has become contaminated by sludge is delivered to the contaminant tank 74 from the machining tank 70. The dielectric working fluid LQ collected and stored in the contaminant tank 74 is supplied to the sludge removal device 30a of the above-described dielectric working fluid adjustment apparatus 12 through the connecting pipes 36 provided in the contaminant tank 74. The clean dielectric working fluid LQ from which sludge has been removed by the sludge removal device 30a is delivered to the clean tank 76 of the dielectric working fluid storage tank 72 through the connecting pipes 56. Further, the dielectric working fluid LQ collected and stored in the clean tank 76 is supplied through the connecting pipes 44 to the deionizing device 30b, the fluid temperature adjusting device 30c, and the drainage device 30d of the dielectric working fluid adjustment apparatus 12. The dielectric working fluid LQ, the electrical conductivity and the temperature of which has been adjusted by the deionizing device 30b and the fluid temperature adjusting device 30c, and the new dielectric working fluid LQ supplied from the fluid supplying device 30e are delivered to the clean tank 76 of the dielectric working fluid storage tank 72 through the connecting pipes 56. The dielectric working fluid LQ supplied to the drainage device 30d is discharged to the exterior.

A conductivity sensor 80, a temperature sensor 82, a bacteria sensor (freshness sensor) 84, a sludge concentration sensor 86, and a fluid level sensor 88 are provided in the clean tank 76 for detecting the quality and condition, etc., of the dielectric working fluid LQ stored in the clean tank 76. The conductivity sensor 80 detects the electrical conductivity of the dielectric working fluid LQ, and the temperature sensor 82 detects the temperature of the dielectric working fluid LQ. The bacteria sensor 84 detects an amount of bacteria (or stated otherwise, a freshness of the dielectric working fluid LQ) contained within the dielectric working fluid LQ and is a cause of deterioration thereof, and the sludge concentration sensor 86 detects the concentration of sludge in the dielectric working fluid LQ. The fluid level sensor 88 detects a fluid level of the dielectric working fluid LQ that is stored in the clean tank 76. Further, a fluid level sensor 90 is provided in the contaminant tank 74 for detecting the fluid level of the dielectric working fluid LQ stored in the contaminant tank 74. Each of the fluid level sensors 88, 90 may be a float switch or a fluid pressure gauge.

Detection signals detected and transmitted by the conductivity sensor 80, the temperature sensor 82, the bacteria sensor (freshness sensor) 84, the sludge concentration sensor 86, and the fluid level sensors 88, 90 are delivered as dielectric working fluid information to a controller 92 of the wire electrical discharge machine 24. The controller 92 transmits the acquired dielectric working fluid information to the dielectric working fluid quality controller 16 of the dielectric working fluid centralized management system 10.

Returning to FIG. 1, in the case that the fluid level of the dielectric working fluid LQ of the contaminant tank 74 as detected by the fluid level sensor 90 is higher than a target value or is not within an allowable range, or in the case that the fluid level of the dielectric working fluid LQ of the clean tank 76 as detected by the fluid level sensor 88 is lower than a target value or is not within an allowable range, the dielectric working fluid quality controller 16 controls and opens the valves 38 (38a, 38b), 42, 54a, and 58 (58a, 58b). In accordance with this feature, the dielectric working fluid LQ of the contaminant tank 74 is supplied to the sludge removal device 30a, and the clean dielectric working fluid LQ from which the sludge has been removed by the sludge removal device 30a is supplied to the clean tank 76. More specifically, if the fluid amount of the dielectric working fluid LQ stored in the contaminant tank 74 is large, or if the fluid amount of the dielectric working fluid LQ stored in the clean tank 76 is small, the dielectric working fluid LQ in the contaminant tank 74 is supplied to the clean tank 76. Consequently, the fluid amount (fluid level) of the dielectric working fluid LQ can be controlled so that the fluid amount (fluid level) of the dielectric working fluid LQ of the contaminant tank 74 is made to approach the target value or to fall within the allowable range, or so that the fluid amount (fluid level) of the dielectric working fluid LQ of the clean tank 76 is made to approach the target value or to fall within the allowable range. At this time, on the basis of the fluid levels of the dielectric working fluids LQ detected by the fluid level sensors 88, 90, the dielectric working fluid quality controller 16 determines a fluid amount of the dielectric working fluid LQ to be supplied from the contaminant tank 74 to the clean tank 76, and a dielectric working fluid LQ of the determined fluid amount is supplied to the clean tank 76.

Further, in the case that the fluid level of the dielectric working fluid LQ of the clean tank 76 as detected by the fluid level sensor 88 is lower than the target value or does not fall within the allowable range, the dielectric working fluid quality controller 16 may supply a new dielectric working fluid LQ to the clean tank 76 from the fluid supplying device 30e, by controlling and opening the valves 54d, 58 (58a, 58b), together with controlling the fluid supplying device 30e. Consequently, the fluid amount (fluid level) of the dielectric working fluid LQ can be controlled so that the fluid amount of the dielectric working fluid LQ of the clean tank 76 is made to approach the target value or to fall within the allowable range. At this time, also, on the basis of the fluid level of the dielectric working fluid LQ as detected by the fluid level sensor 88, the dielectric working fluid quality controller 16 determines a fluid amount of the dielectric working fluid LQ to be supplied by the fluid supplying device 30e, and the fluid supplying device 30e supplies a dielectric working fluid LQ of the determined fluid amount.

From the fluid level of the dielectric working fluid LQ of the contaminant tank 74 as detected by the fluid level sensor 90, and the fluid level of the dielectric working fluid LQ of the clean tank 76 as detected by the fluid level sensor 88, the dielectric working fluid quality controller 16 determines a fluid amount (total amount of fluid) of the dielectric working fluids LQ of the wire electrical discharge machines 24 (24a, 24b). In addition, in the case that the determined fluid amount is lower than the target value or does not fall within the allowable range, the dielectric working fluid quality controller 16 supplies a new dielectric working fluid LQ to the clean tank 76, by controlling and opening the valves 54d, 58 (58a, 58b), together with controlling the fluid supplying device 30e. Consequently, the fluid amount of the dielectric working fluid LQ can be controlled so that the fluid amount of the dielectric working fluid LQ of the wire electrical discharge machines 24 (24a, 24b) is made to approach a target value or to fall within an allowable range. At this time, on the basis of the determined fluid amounts of the dielectric working fluid LQ of the wire electrical discharge machines 24 (24a, 24b), the dielectric working fluid quality controller 16 determines a fluid amount of the dielectric working fluid LQ to be supplied by the fluid supplying device 30e, and the fluid supplying device 30e supplies a dielectric working fluid LQ of the determined fluid amount.

Since the fluid amount of the dielectric working fluid LQ retained in the machining tanks 70 is kept constant, the fluid amount of the dielectric working fluid LQ of the wire electrical discharge machines 24 (24a, 24b) can be determined from the fluid level of the dielectric working fluid LQ of the contaminant tanks 74 and the fluid level of the dielectric working fluid LQ of the clean tanks 76. However, if the fluid amount of the dielectric working fluid LQ retained in the machining tank 70 fluctuates, then by providing a fluid level sensor 94 in the machining tank 70 (shown by the dashed line in FIG. 2), and considering the fluid level detected by the fluid level sensor 94, the fluid amount of the dielectric working fluid LQ of the wire electrical discharge machines 24 (24a, 24b) may also be determined.

In the case that the electrical conductivity detected by the conductivity sensor 80 is higher than a target value or is not within an allowable range, the dielectric working fluid quality controller 16 controls and opens the valves 46 (46a, 46b), 50a, 54b, and 58 (58a, 58b). Accordingly, the dielectric working fluid LQ of the clean tank 76 is supplied to the deionizing device 30b, and the dielectric working fluid LQ, the electrical conductivity of which has been lowered by the ion exchange resin of the deionizing device 30b, is supplied again to the clean tank 76. Consequently, the electrical conductivity of the dielectric working fluid LQ can be controlled so that the electrical conductivity of the dielectric working fluid LQ of the clean tank 76 is made to approach the target value or to fall within the allowable range. At this time, on the basis of the electrical conductivity detected by the conductivity sensor 80, the dielectric working fluid quality controller 16 determines a fluid amount of the dielectric working fluid LQ to flow to the deionizing device 30b, and a dielectric working fluid LQ of the determined fluid amount is supplied to the deionizing device 30b.

In the case that the temperature detected by the temperature sensor 82 is higher than a target value or is not within an allowable range, the dielectric working fluid quality controller 16 controls and opens the valves 46 (46a, 46b), 50b, 54c, and 58 (58a, 58b). In accordance therewith, the dielectric working fluid LQ of the clean tank 76 is supplied to the fluid temperature adjusting device 30c, and a dielectric working fluid LQ, the temperature of which has been lowered by the fluid temperature adjusting device 30c, is supplied to the clean tank 76. Consequently, the temperature of the dielectric working fluid LQ can be controlled so that the temperature of the dielectric working fluid LQ of the clean tank 76 is made to approach the target value or to fall within the allowable range. At this time, on the basis of the temperature detected by the temperature sensor 82, the dielectric working fluid quality controller 16 determines a fluid amount of the dielectric working fluid LQ to flow to the fluid temperature adjusting device 30c, and a dielectric working fluid LQ of the determined fluid amount is supplied to the fluid temperature adjusting device 30c. The fluid temperature adjusting device 30c is controlled by the dielectric working fluid quality controller 16.

Bacteria contained within the dielectric working fluid LQ becomes a cause of deterioration of the dielectric working fluid LQ (a cause of degradation of the freshness of the dielectric working fluid LQ). Therefore, in the case that the amount of bacteria in the dielectric working fluid LQ as detected by the bacteria sensor 84 becomes greater than a target value or does not fall within an allowable range, the dielectric working fluid quality controller 16 controls and opens the valves 46 (46a, 46b), 50c, together with controlling the drainage device 30d, whereby the dielectric working fluid LQ of the clean tank 76 is drained. At this time, on the basis of the amount of bacteria detected by the bacteria sensor 84, the dielectric working fluid quality controller 16 determines a drainage amount (fluid amount) of the dielectric working fluid LQ to be drained by the drainage device 30d, and the drainage device 30d drains the dielectric working fluid LQ of the determined drainage amount. Further, in the case that the drainage device 30d has drained the dielectric working fluid LQ, the dielectric working fluid quality controller 16 controls and opens the valves 54d, 58 (58a, 58b), together with controlling the fluid supplying device 30e, whereby a new dielectric working fluid LQ is supplied to the clean tank 76. At this time, the fluid supplying device 30e supplies to the clean tank 76 a fluid amount of the dielectric working fluid LQ corresponding to the drainage amount (fluid amount) that was drained by the drainage device 30d. Consequently, since at least a portion of the old dielectric working fluid LQ in the clean tank 76 is drained, together with supplying new dielectric working fluid LQ into the clean tank 76, the freshness of the dielectric working fluid LQ can be controlled so that the freshness of the dielectric working fluid LQ in the clean tank 76 is made to approach a target value or to fall within an allowable range. Moreover, without providing the bacteria sensor 84, deterioration of the dielectric working fluid LQ may be prevented by draining the dielectric working fluid LQ and replacing a portion of the dielectric working fluid LQ periodically, each time that the date and time has passed a predetermined period, each time that a predetermined period of machining time has elapsed, or each time that a predetermined period of power-on time of the wire electrical discharge machines 24 has elapsed.

The dielectric working fluid quality controller 16 may acquire from the external device 22 and via the external communication unit 18 the target values or the allowable ranges of the wire electrical discharge machines 24 (target value or allowable range for the fluid level/amount of the contaminant tank 74, target value or allowable range for the fluid level/amount of the clean tank 76, target value or allowable range for the fluid amount (total fluid amount) of the dielectric working fluids LQ of the wire electrical discharge machines 24, target value or allowable range for the electrical conductivity, target value or allowable range for the temperature, and target value or allowable range for the freshness/bacteria amount). The external communication unit 18 performs wired or wireless communications with the display unit 20 and the external device 22 as external equipment, and carries out communications using, for example, ethernet, USB cables, RS-232C protocol, WiFi, Bluetooth (registered trademark), or infrared communications, etc. Further, the dielectric working fluid quality controller 16 may transmit to the external device (e.g., a controller such as a computer or the like) 22 the dielectric working fluid information obtained respectively from each of the wire electrical discharge machines 24 (24a, 24b), or operating information indicative of the operating states of each of the dielectric working fluid adjustment devices 30 of the dielectric working fluid adjustment apparatus 12.

The dielectric working fluid centralized management system 10 is connected to a plurality of (in the present embodiment, two) wire electrical discharge machines 24, and therefore, there is a tendency for dielectric working fluids LQ of the plurality of wire electrical discharge machines 24 to become mutually intermixed. When the dielectric working fluids LQ are mutually intermixed, it becomes difficult to adjust the fluid quality of the dielectric working fluids LQ of each of the wire electrical discharge machines 24 (24a, 24b). Further, in each of the wire electrical discharge machines 24, electrical conductivities suitable for the machining conditions are set separately, and by setting the electrical conductivities so as not to become unnecessarily high, the electrical conductivities are set so as to extend the useful lifetime of the ion exchange resin inside the deionizing device 30b. Therefore, the dielectric working fluid quality controller 16 controls the dielectric working fluid delivery and reception control member 14 (the respective valves 38, 42, 46, 50, 54, 58 and the aforementioned pumps), so as not to mix with each other the dielectric working fluids LQ of the plurality of wire electrical discharge machines 24, and so as to connect the dielectric working fluid storage tank 72 of only one of the wire electrical discharge machines 24 to the dielectric working fluid adjustment apparatus 12.

For example, in the case that the dielectric working fluid adjustment apparatus 12 and the wire electrical discharge machine 24a are connected, a condition may be established in which the valves 38b, 46b, 58b are controlled and closed. Conversely, in the case that the dielectric working fluid adjustment apparatus 12 and the wire electrical discharge machine 24b are connected, a condition may be established in which the valves 38a, 46a, 58a are controlled and closed. In accordance with this feature, intermixing of the dielectric working fluid LQ of the wire electrical discharge machine 24a and the dielectric working fluid LQ of the wire electrical discharge machine 24b can be prevented.

Further, on the basis of the dielectric working fluid information obtained from each of the plurality of wire electrical discharge machines 24, the dielectric working fluid quality controller 16 determines whether or not there is a wire electrical discharge machine 24 (dielectric working fluid storage tank 72) needed to be connected to the dielectric working fluid adjustment apparatus 12. In the case it is determined that there are a plurality of wire electrical discharge machines 24 (dielectric working fluid storage tanks 72) that were judged as needing to be connected to the dielectric working fluid adjustment apparatus 12, then based on the dielectric working fluid information of each of the wire electrical discharge machines 24, the dielectric working fluid quality controller 16 determines an order of priority of the wire electrical discharge machines 24 to be connected to the dielectric working fluid adjustment apparatus 12. In addition, connections to the dielectric working fluid adjustment apparatus 12 are made in order from the wire electrical discharge machines 24 for which the priority thereof is high. As a manner for determining the order of priority, for example, in the case there are a plurality of wire electrical discharge machines 24 for which the electrical conductivity or the temperature of the dielectric working fluids LQ therein is high, they may be prioritized in a descending order of the electrical conductivities or temperatures of the dielectric working fluids LQ thereof. Stated otherwise, if there are a plurality of wire electrical discharge machines 24 desired to be adjusted to have the same type of fluid quality, the wire electrical discharge machines 24 may be prioritized in a descending order beginning with those that are farthest away from the target value or the allowable range. Further, in the case it is determined that there are a plurality of wire electrical discharge machines 24 needing to be connected with the dielectric working fluid adjustment apparatus 12, and in the case that different types of fluid quality adjustments are to be made in each of the wire electrical discharge machines 24, then a predetermined order of priority may be followed depending on the type of fluid quality adjustment. For example, the priority ordering of the fluid quality adjustment to prevent deterioration of the dielectric working fluids LQ may be given the first ranking, and thereafter, priorities may be assigned depending on the type of fluid quality adjustment, in the cases of electrical conductivity, temperature, fluid amount, . . . , and so forth. Further, the dielectric working fluid quality controller 16 may acquire the priority rankings from an external device (e.g., a controller such as a computer or the like) 22 through the external communication unit 18.

Moreover, even though the fluid quality of the dielectric working fluids LQ of the plurality of wire electrical discharge machines 24 is adjusted collectively and at the same time, the fluid quality of the dielectric working fluids LQ can be adjusted easily, and if it is considered to be more efficient that way, for example, the dielectric working fluids LQ of the plurality of wire electrical discharge machines 24 may be mixed mutually with each other. For example, if the states of the current fluid quality of the dielectric working fluids LQ of the wire electrical discharge machines 24 are approximately the same, or if the target values and the allowable ranges of the wire electrical discharge machines 24 are approximately the same, the dielectric working fluids LQ of the wire electrical discharge machines 24, which have a close resemblance, may be mixed.

In this instance, when the dielectric working fluid quality controller 16 controls at least the dielectric working fluid delivery and reception control member 14, and the dielectric working fluid storage tank 72 of the wire electrical discharge machine 24 that serves as an adjustment target is connected to the dielectric working fluid adjustment apparatus 12, adjustment of the fluid quality of the dielectric working fluid LQ of the wire electrical discharge machine 24 that is the adjustment target is performed in the same manner as noted previously. At this time, the dielectric working fluid quality controller 16 determines whether or not the fluid quality of the dielectric working fluid LQ falls within an allowable dielectric working fluid quality range on the basis of the dielectric working fluid information received from the wire electrical discharge machine 24 that is the adjustment target. The allowable dielectric working fluid quality range is defined by a range within which the precision of the wire electrical discharge machining is not lowered, and a range within which the fluid quality of the dielectric working fluid LQ can be tolerated. In addition, in the case it is determined that the fluid quality of the dielectric working fluid LQ of the wire electrical discharge machine 24 that is the adjustment target falls outside of the allowable dielectric working fluid quality range, even if at least a predetermined time has elapsed from the dielectric working fluid quality controller 16 controlling the dielectric working fluid delivery and reception control member 14, it is determined that there is an abnormality in the dielectric working fluid adjustment device 30 that has adjusted the quality of the dielectric working fluid LQ. The dielectric working fluid quality controller 16 transmits through the external communication unit 18 abnormality information of the dielectric working fluid adjustment device 30 that was determined to be abnormal, to the display unit 20 as external equipment. The display unit 20 displays the received abnormality information of the dielectric working fluid adjustment device 30.

For example, when the dielectric working fluid quality controller 16 controls the dielectric working fluid delivery and reception control member 14, and the dielectric working fluid storage tank 72a of the wire electrical discharge machine 24a is connected to the deionizing device 30b of the dielectric working fluid adjustment apparatus 12, the fluid quality (electrical conductivity) of the dielectric working fluid LQ of the wire electrical discharge machine 24a is adjusted. Consequently, since the electrical conductivity of the dielectric working fluid LQ is decreased by the deionizing device 30b, lowering of the electrical conductivity of the dielectric working fluid LQ in the clean tank 76 can be expected. However, even after elapse of the predetermined time period, in the case that the electrical conductivity of the detected clean tank 76 as detected by the conductivity sensor 80 is not decreased at all, and remains outside the allowable dielectric working fluid quality range, it may be considered that the ion exchange resin of the deionizing device 30b has deteriorated (been consumed). Accordingly, the dielectric working fluid quality controller 16 transmits to the display unit 20 abnormality information of the deionizing device 30b. By observing the information displayed on the display unit 20, the operator can recognize that it is time for the ion exchange resin of the deionizing device 30b to be replaced, and can return the deionizing device 30b to a normal condition by exchanging or replacing the ion exchange resin thereof. Further, in the case that abnormalities are determined to exist in the fluid temperature adjusting device 30c, the drainage device 30d, or the fluid supplying device 30e, and abnormality information thereof is transmitted to the display unit 20, the operator carries out inspection and replacement of components, etc., in the fluid temperature adjusting device 30c, the drainage device 30d, or the fluid supplying device 30e. Moreover, by narrowing the allowable dielectric working fluid quality range, it is possible for the need for exchange and replacement of the ion exchange resin, the filter, other components, etc., as consumable items to be notified to the operator at an early stage. Further, by providing the allowable dielectric working fluid quality range, and a warning range that is narrower than the allowable dielectric working fluid quality range, it also is possible to encourage early replacement or preparation for replacement of such consumables.

Because the clean tank 76 stores therein a clean dielectric working fluid LQ from which sludge has been removed by the sludge removal device 30a, the sludge concentration detected by the sludge concentration sensor 86 should be less than or equal to a predetermined value. However, if it is determined that the sludge concentration is higher than such a predetermined value, it may be considered that the filter of the sludge removal device 30a has become degraded (consumed). Further, as another means for detecting degradation of the filter, without providing the sludge concentration sensor 86, midway in the piping that feeds the dielectric working fluid LQ to the sludge removal device 30a, a non-illustrated pressure sensor may be disposed for detecting the lifetime of the filter, whereby degradation (depletion) thereof due to clogging of the filter may be determined by detecting a rise in the pressure value. Accordingly, if the sludge concentration has become higher than a predetermined value, or in the case that the value of the pressure sensor for detecting the lifetime of the filter has become greater than a predetermined value, the dielectric working fluid quality controller 16 immediately transmits to the display unit 20 abnormality information of the sludge removal device 30a. In accordance therewith, by replacing the filter, the operator can return the sludge removal device 30a to a normal condition. Moreover, by raising or lowering the predetermined value, replacement of the filter as a consumable article can be notified to the operator at an early stage. Further, by providing the predetermined value, and a warning value that is lower than the predetermined value, it also is possible to encourage early replacement or preparation for replacement of the filter. The dielectric working fluid quality controller 16 may also transmit to the external device 22 or may transmit to other external equipment the abnormality information of the dielectric working fluid adjustment device 30 through the external communication unit 18.

The dielectric working fluid centralized management system 10 according to the present embodiment is equipped with the dielectric working fluid adjustment apparatus 12 for adjusting the fluid quality of a dielectric working fluid LQ of the plurality of wire electrical discharge machines 24, the dielectric working fluid delivery and reception control member 14 for controlling delivery and reception of the dielectric working fluid LQ between the plurality of dielectric working fluid storage tanks 72 disposed corresponding respectively to the plurality of wire electrical discharge machines 24, and in which the dielectric working fluid LQ is stored, and the dielectric working fluid adjustment apparatus 12, and the dielectric working fluid quality controller 16, which receives dielectric working fluid information from the plurality of wire electrical discharge machines 24 and controls the dielectric working fluid delivery and reception control member 14, or both the dielectric working fluid delivery and reception control member 14 and the dielectric working fluid adjustment apparatus 12. In accordance with this feature, the fluid quality of the dielectric working fluid LQ of each of the plurality of wire electrical discharge machines 24 can be managed collectively. Further, maintenance and inspection of devices or materials that adjust the fluid quality of the dielectric working fluid LQ of the plurality of wire electrical discharge machines 24 is facilitated, and together therewith, since there is no need to provide the dielectric working fluid adjustment apparatus 12 in each of the wire electrical discharge machines 24, equipment expenditures can be reduced in cost.

The dielectric working fluid adjustment apparatus 12 comprises at least one dielectric working fluid adjustment device 30 selected from among the fluid supplying device 30e that supplies a new dielectric working fluid LQ, the deionizing device 30b that adjusts the electrical conductivity of the dielectric working fluid LQ, the sludge removal device 30a that removes sludge generated in the dielectric working fluid LQ due to electrical discharge machining, the drainage device 30d that drains the dielectric working fluid LQ, and the fluid temperature adjusting device 30c that adjusts the temperature of the dielectric working fluid LQ. In accordance with this feature, the dielectric working fluid LQ can be adjusted to a necessary fluid quality for performing wire electrical discharge machining.

The dielectric working fluid delivery and reception control member 14 includes the common fluid feed pipe 34 and the common fluid receiving pipe 32 that are connected to the plurality of dielectric working fluid storage tanks 72 and the dielectric working fluid adjustment apparatus 12. The common fluid feed pipe 34 is a pipe for the dielectric working fluid LQ that flows from the dielectric working fluid adjustment apparatus 12 to the plurality of dielectric working fluid storage tanks 72, and the common fluid receiving pipe 32 is a pipe for the dielectric working fluid LQ that flows from the plurality of dielectric working fluid storage tanks 72 to the dielectric working fluid adjustment apparatus 12. The dielectric working fluid delivery and reception control member 14 controls connections between the dielectric working fluid storage tanks 72 and the respective dielectric working fluid adjustment devices 30 of the dielectric working fluid adjustment apparatus 12. In accordance with this feature, since the number of pipes is reduced, it is possible for the installation area for such pipes to be made smaller, and equipment expenditures can be suppressed. In other words, when fluid feed pipes and fluid receiving pipes are provided for each of the dielectric working fluid adjustment devices 30, the number of the fluid feed pipes and fluid receiving pipes becomes large in number. In particular, this is even more true if the types of the dielectric working fluid adjustment devices 30 is large. Consequently, when multiple fluid feed pipes and fluid receiving pipes are provided for each of the dielectric working fluid adjustment devices 30, the installation space for the fluid feed pipes and the fluid receiving pipes increases in size, and equipment expenditures also rise. However, with the dielectric working fluid centralized management system 10 of the present embodiment, problems of this type can be suppressed.

The dielectric working fluid quality controller 16 may control at least the dielectric working fluid delivery and reception control member 14, so that at least one from among a fluid amount of the dielectric working fluid LQ of the wire electrical discharge machines 24, an electrical conductivity of the dielectric working fluid LQ, a fluid level of the dielectric working fluid LQ of the dielectric working fluid storage tanks 72, a freshness of the dielectric working fluid LQ, and a temperature of the dielectric working fluid LQ approaches a target value or falls within an allowable range. In accordance with this feature, the dielectric working fluid LQ can be adjusted to a necessary fluid quality for performing wire electrical discharge machining.

The dielectric working fluid centralized management system 10 comprises the external communication unit 18 for performing communications with the external device 22. Through the external communication unit 18, the dielectric working fluid quality controller 16 obtains from the external device 22 the target value or the allowable range. In accordance with this feature, the fluid quality of the dielectric working fluid LQ can be controlled from the external device 22. In other words, the fluid quality of the dielectric working fluid LQ can be managed from a remote location distanced from the dielectric working fluid centralized management system 10.

The dielectric working fluid quality controller 16 may control the dielectric working fluid delivery and reception control member 14, so as not to mix with each other the dielectric working fluid LQ of the plurality of wire electrical discharge machines 24, and so as to connect the dielectric working fluid storage tank 72 of one of the wire electrical discharge machines 24 to the dielectric working fluid adjustment apparatus 12. In accordance with this feature, the fluid quality of the dielectric working fluid LQ of each of the wire electrical discharge machines 24 can easily be managed.

On the basis of the dielectric working fluid information received from the plurality of wire electrical discharge machines 24, the dielectric working fluid quality controller 16 determines whether or not it is necessary to connect the dielectric working fluid storage tanks 72 of the plurality of wire electrical discharge machines 24 to the dielectric working fluid adjustment apparatus 12. In addition, if such a need is determined to exist, then on the basis of the dielectric working fluid information from each of the wire electrical discharge machines 24, the dielectric working fluid quality controller 16 may determine an order of priority of the wire electrical discharge machines 24 to be connected to the dielectric working fluid adjustment apparatus 12. In accordance with this feature, since adjustment of the dielectric working fluid LQ is performed in order from the wire electrical discharge machines 24 requiring urgent attention, productivity can be improved without requiring stoppage of the wire electrical discharge machines 24.

After the dielectric working fluid delivery and reception control member 14 is controlled, and the dielectric working fluid storage tank 72 of the wire electrical discharge machine 24 that serves as an adjustment target has been connected to the dielectric working fluid adjustment apparatus 12, the dielectric working fluid quality controller 16 determines whether or not the quality of the dielectric working fluid LQ falls within an allowable dielectric working fluid quality range on the basis of the dielectric working fluid information received from the wire electrical discharge machine 24 that is the adjustment target. In the case it is determined that the quality of the dielectric working fluid LQ of the wire electrical discharge machine 24 that is the adjustment target falls outside of the allowable dielectric working fluid quality range, even if a predetermined time has elapsed, the dielectric working fluid quality controller 16 determines that there is an abnormality in the dielectric working fluid adjustment device 30 that has adjusted the quality of the dielectric working fluid LQ. In addition, the dielectric working fluid quality controller 16 transmits through the external communication unit 18 abnormality information of the dielectric working fluid adjustment device 30 that was determined to be abnormal. In accordance with this feature, it can be notified to the exterior whether a particular dielectric working fluid adjustment device 30 is abnormal, maintenance operations thereon can swiftly be carried out, and productivity can be improved. Further, when the abnormality information is received, the display unit 20 displays an indication that there is an abnormality in the dielectric working fluid adjustment device 30 that was judged to be abnormal. In accordance with this feature, an operator can easily and quickly confirm dielectric working fluid adjustment devices 30 that are abnormal.

The external communication unit 18 may transmit at least one of the dielectric working fluid information acquired from the dielectric working fluid quality controller 16, and operating information of each of the dielectric working fluid adjustment devices 30 of the dielectric working fluid adjustment apparatus 12. In accordance with this feature, from a remote location distanced from the dielectric working fluid centralized management system 10, the operator can determine an order of priority of the wire electrical discharge machines 24 connected to the dielectric working fluid adjustment apparatus 12, and the lifetime of respective consumables therein can be determined and estimated.

The dielectric working fluid adjustment apparatus 12 may comprise at least one dielectric working fluid adjustment device 30. For example, the dielectric working fluid adjustment apparatus 12 need not necessarily be equipped with the sludge removal device 30a. In this case, the first common pipe 32a, the connecting pipes 36 (36a, 36b), and the pipe 40 of the dielectric working fluid delivery and reception control member 14 become unnecessary. Also in this case, the second common pipe 32b alone becomes the common fluid receiving pipe 32.

Modification

The dielectric working fluid centralized management system 10 of the above-described embodiment may be modified in the following manner.

FIG. 3 is a view showing a configuration of a dielectric working fluid centralized management system 10 according to a modification. Structures and elements that are the same as those of aforementioned embodiment are denoted with the same reference characters, and only parts that differ from aforementioned embodiment will be described. According to the above embodiment, the dielectric working fluids LQ that were delivered out from the deionizing device 30b and the fluid temperature adjusting device 30c were sent to the clean tanks 76 of the wire electrical discharge machines 24 (24a, 24b) through the common fluid feed pipe 34 and the connecting pipes 56 (56a, 56b). However, according to the present modification, the dielectric working fluids LQ that are delivered out from the deionizing device 30b and the fluid temperature adjusting device 30c are sent to the contaminant tanks 74 of the wire electrical discharge machines 24 (24a, 24b).

In the present modification, a common fluid feed pipe 34A includes a third common pipe 34a and a fourth common pipe 34b. The third common pipe 34a is a pipe connecting the sludge removal device 30a and the fluid supplying device 30e with the clean tanks 76 of the wire electrical discharge machines 24. Accordingly, the pipe 52a connected to the sludge removal device 30a, the pipe 52d connected to the fluid supplying device 30e, and the connecting pipes 56a, 56b connected to the clean tanks 76 communicate with (are connected to) the third common pipe 34a. In accordance with this feature, similar to the above-described embodiment, the dielectric working fluids LQ supplied from the contaminant tanks 74 of the respective wire electrical discharge machines 24 (24a, 24b) are delivered to the clean tanks 76 of the respective wire electrical discharge machines 24 (24a, 24b) while passing through the sludge removal device 30a. Further, the new dielectric working fluid LQ supplied from the fluid supplying device 30e is delivered to the clean tanks 76 of the respective wire electrical discharge machines 24 (24a, 24b).

The fourth common pipe 34b is a pipe for connecting the deionizing device 30b and the fluid temperature adjusting device 30c with the contaminant tanks 74 of the wire electrical discharge machines 24 (24a, 24b). For this reason, the pipe 52b connected to the deionizing device 30b and the pipe 52c connected to the fluid temperature adjusting device 30c communicate with (are connected to) the fourth common pipe 34b. In addition, the dielectric working fluid delivery and reception control member 14 further includes connecting pipes 100 (100a, 100b) that connect the fourth common pipe 34b with the contaminant tanks 74 of the respective wire electrical discharge machines 24 (24a, 24b). In accordance with this feature, the dielectric working fluids LQ supplied from the clean tanks 76 of the respective wire electrical discharge machines 24 (24a, 24b) are delivered to the contaminant tanks 74 of the respective wire electrical discharge machines 24 (24a, 24b) while passing through the deionizing device 30b or the fluid temperature adjusting device 30c. The dielectric working fluid quality controller 16 controls the dielectric working fluid delivery and reception control member 14 on the basis of the fluid level of the contaminant tank 74 as detected by the fluid level sensor 90 or the fluid level of the clean tank 76 as detected by the fluid level sensor 88, and delivers the dielectric working fluid LQ that is stored in the clean tank 76 to the contaminant tank 74 while passing through the deionizing device 30b or the fluid temperature adjusting device 30c. Valves 102 (102a, 102b) for switching the flow passages of the dielectric working fluid LQ are provided respectively in each of the connecting pipes 100 (100a, 100b).

A new dielectric working fluid LQ may be supplied to the contaminant tanks 74 from the fluid supplying device 30e. In this case, the pipe 52d connected to the fluid supplying device 30e may be connected to the fourth common pipe 34b. Further, a new dielectric working fluid LQ may be supplied selectively from the fluid supplying device 30e to either one of the contaminant tanks 74 and the clean tanks 76. In this case, in the configuration shown in FIG. 3, piping may further be provided for connecting the fluid supplying device 30e and the fourth common pipe 34b, together with providing a valve in such piping. Consequently, the dielectric working fluid quality controller 16 may control the dielectric working fluid delivery and reception control member 14 on the basis of the fluid level of the dielectric working fluid LQ of the contaminant tank 74 as detected by the fluid level sensor 90 and/or on the basis of the fluid level of the dielectric working fluid LQ of the clean tank 76 as detected by the fluid level sensor 88, and may supply the dielectric working fluid LQ to either the contaminant tank 74 or the clean tank 76. Furthermore, the dielectric working fluid quality controller 16 may control the dielectric working fluid delivery and reception control member 14 on the basis of the fluid level of the dielectric working fluid LQ of the contaminant tank 74 as detected by the fluid level sensor 90 and on the basis of the fluid level of the dielectric working fluid LQ of the clean tank 76 as detected by the fluid level sensor 88, and may supply the dielectric working fluid LQ simultaneously to both the contaminant tank 74 and the clean tank 76.

The dielectric working fluid centralized management system according to the present invention is not limited to the aforementioned embodiments, and it is a matter of course that various additional or modified structures may be adopted therein without deviating from the essential scope of the present invention.

What is claimed is:

1. A dielectric working fluid centralized management system comprising:
   a dielectric working fluid adjustment apparatus configured to adjust at least one quality of a dielectric working fluid utilized by a plurality of wire electrical discharge machines;
   a dielectric working fluid delivery and reception control member configured to control delivery and reception of the dielectric working fluid between a plurality of dielectric working fluid storage tanks disposed correspondingly respectively to the plurality of wire electrical discharge machines, and in which the dielectric working fluid is stored, and the dielectric working fluid adjustment apparatus; and
   a dielectric working fluid quality controller configured to receive dielectric working fluid information from the plurality of wire electrical discharge machines and to control the dielectric working fluid delivery and reception control member, or both the dielectric working fluid delivery and reception control member and the dielectric working fluid adjustment apparatus,
   wherein the dielectric working fluid quality controller is configured to control the dielectric working fluid delivery and reception control member, so as to connect the dielectric working fluid storage tank of a first of the wire electrical discharge machines to the dielectric working fluid adjustment apparatus and not connect the dielectric working fluid storage tank of the other of the wire electrical discharge machines to the dielectric working fluid adjustment apparatus, in order to not mix the dielectric working fluids of the other of the plurality of wire electrical discharge machines with the first wire electrical discharge machines wherein the dielectric working fluid adjustment apparatus comprises at least one dielectric working fluid adjustment device selected from among a fluid supplying device configured to supply a new dielectric working fluid, a deionizing device configured to adjust an electrical conductivity of the dielectric working fluid, a sludge removal device configured to remove sludge generated in the dielectric working fluid due to electrical discharge, a drainage device configured to drain the dielectric working fluid, and a fluid temperature adjusting device configured to adjust the temperature of the dielectric working fluid.

2. The dielectric working fluid centralized management system according to claim 1, wherein:
   the dielectric working fluid delivery and reception control member includes a common fluid feed pipe and a common fluid receiving pipe that are connected to the plurality of dielectric working fluid storage tanks and the dielectric working fluid adjustment apparatus;
   the common fluid feed pipe is a pipe for the dielectric working fluid that flows from the dielectric working fluid adjustment apparatus to the plurality of dielectric working fluid storage tanks, and the common fluid receiving pipe is a pipe for the dielectric working fluid that flows from the plurality of dielectric working fluid storage tanks to the dielectric working fluid adjustment apparatus; and
   the dielectric working fluid delivery and reception control member is configured to control connections between the dielectric working fluid storage tanks and each of respective dielectric working fluid adjustment devices of the dielectric working fluid adjustment apparatus.

3. The dielectric working fluid centralized management system according to claim 1, wherein the dielectric working fluid quality controller controls at least the dielectric working fluid delivery and reception control member, so that at least one from among a fluid amount of the dielectric working fluid of the wire electrical discharge machines, an electrical conductivity of the dielectric working fluid, a fluid level of the dielectric working fluid of the dielectric working fluid storage tanks, a freshness of the dielectric working fluid, and a temperature of the dielectric working fluid approaches a target value or falls within an allowable range.

4. The dielectric working fluid centralized management system according to claim 3, further comprising:
   an external communication unit configured to perform communication with an external device;
   wherein, through the external communication unit, the dielectric working fluid quality controller obtains from the external device the target value or the allowable range.

5. The dielectric working fluid centralized management system according to claim 1, wherein, in a case it is determined, based on the dielectric working fluid information received from each of the plurality of wire electrical discharge machines, that it is necessary to connect the dielectric working fluid storage tanks of the plurality of wire electrical discharge machines to the dielectric working fluid adjustment apparatus, then on a basis of the dielectric working fluid information of each of the wire electrical discharge machines, the dielectric working fluid quality controller determines a priority of the wire electrical discharge machines to be connected to the dielectric working fluid adjustment apparatus.

6. The dielectric working fluid centralized management system according to claim 1, further comprising:
   an external communication unit configured to perform communication with external equipment;
   wherein, after the dielectric working fluid delivery and reception control member is controlled, and the dielectric working fluid storage tank of the wire electrical discharge machine that serves as an adjustment target has been connected to the dielectric working fluid adjustment apparatus, the dielectric working fluid quality controller is configured to determine whether or not the quality of the dielectric working fluid falls within an allowable dielectric working fluid quality range on a basis of the dielectric working fluid information received from the wire electrical discharge machine that is the adjustment target, and in a case it is determined that the quality of the dielectric working fluid of the wire electrical discharge machine that is the adjustment target falls outside of the allowable dielectric working fluid quality range, even if a predetermined time has elapsed, to determine that there is an abnormality in the dielectric working fluid adjustment device of the dielectric working fluid adjustment apparatus by which the fluid quality of the dielectric working fluid was adjusted, and to transmit through the external communication unit abnormality information of the dielectric working fluid adjustment device that was determined to be abnormal.

7. The dielectric working fluid centralized management system according to claim 6, wherein:
the external equipment is a display unit; and
in a case that the abnormality information is received, the display unit is configured to display an indication that there is an abnormality in the dielectric working fluid adjustment device that was judged to be abnormal.

8. The dielectric working fluid centralized management system according to claim 1, further comprising:
an external communication unit configured to perform communication with an external device;
wherein the external communication unit is configured to transmit at least one of the dielectric working fluid information acquired from the dielectric working fluid quality controller, and operating information of each of the dielectric working fluid adjustment devices of the dielectric working fluid adjustment apparatus.

* * * * *